Nov. 30, 1943.  M. C. MEYER  2,335,293
REINFORCEMENT OF PLASTIC CONTAINERS
Filed Feb. 21, 1939

INVENTOR.
Maximilian Courtland Meyer
BY Ostrolenk & Greene
ATTORNEYS

Patented Nov. 30, 1943

2,335,293

UNITED STATES PATENT OFFICE 2,335,293

REINFORCEMENT OF PLASTIC CONTAINERS

Maximilian Courtland Meyer, Brooklyn, N. Y., assignor to Duranol Products, Inc., Brooklyn, N. Y., a corporation of New York Application February 21, 1939, Serial No. 257,611

3 Claims. (Cl. 229—3.5)

My invention relates to a novel construction comprising plastic sheets and a plastic coated wire, and more specifically my invention relates to constructions formed from plastic sheeting such as cellulosic derivatives, synthetic resins, and the like in the form of containers, display covers and plastic sheet constructions generally in which a metallic wire having a thin plastic coating is employed as a guide element in the formation of a structure as a reinforcement for joints, at edges, and further as a joining means per se.

The plastic art has rapidly developed in the direction of containers and display covers formed from plastic sheetings of many different kinds. The material which comprises plastic sheetings may be cellulose derivatives, such as cellulose acetate, cellulose nitrate or the cellulose ethers, such as benzyl- or ethyl-cellulose, or such sheeting may comprise synthetic resins, such as vinyl acetate, vinyl chloride, vinyl acetal or the more recently developed family of acrylic compounds, including the esters of methacrylic acid, such as methyl methacrylate, sold under the trade-mark of "Lucite" or methyl- or ethylacrylate. All of these plastic compounds may be formed into thin plastic sheets of the order of 5, 10, 15 or 20 thousandths of an inch thickness which are extremely valuable in the formation of structures such as I have set forth above.

For the large part these materials are thermoplastic, that is, they soften under the action of heat and when properly plasticized or treated with volatile solvent they may be caused to adhere to each other.

As has been recognized by the prior art, however, these thin plastic sheets have the deficiency in that they do not have a cut edge strength that is sufficient to withstand the hard wear to which such containers and display covers are subjected in ordinary usage. In addition, the sheet itself because of its thickness has a limited strength. For this reason it has been found necessary to employ certain means for imparting edge strength to the sheetings when used in such constructions. It has been suggested that such raw edges be spun over when softened to form a bead, but such spun-over bead formation is inherently weak and does not measure up to the requirements of a quality construction.

In my Patent No. 2,133,629, issued October 18, 1938, I have shown an improved reinforcement construction consisting of a strand of plastic material which is adapted to be cemented flush with the edge of the plastic sheeting to impart reinforcement thereto. Such reinforcement, although it imparts the proper strength to the edge has had certain deficiencies that have caused me to search farther for an improved form for such reinforcing means and also to develop certain new processes for the construction of containers using a reinforcement of this nature.

The deficiencies of this plastic strand lie in the fact that it is in its normal condition poorly workable, that is, it cannot be wound without softening as by heat or solvent into the complex or acute forms which I desire to form as in the case of display containers. This is because although the plastic material which comprises this strand is flexible to a certain extent, if it is bent to an acute angle in its normal form, that is in the unheated condition, it will break off or split.

Further, if it is heated it is necessary that it immediately be set to its proper shape for it quickly cools while being held in the operator's hands and when it does cool it regains its real rigidity.

I desire to emphasize the lack of good working qualities of this plastic strand because of its importance both during the manufacture of the container and also in the finished article. Often even after the plastic strand has been heated and set to a desired shape it has a tendency to spring back which causes certain strains and in the event that there is any weakening in the adhesive or solvent contact between the plastic strand and the plastic sheet, there is a definite tendency for separation therebetween.

In other words, the plastic strand does not always permanently set in the normal bent condition in which it must be used, but has a tendency to spring back. This is preeminently undesirable. Further, this plastic strand does not have a tensile strength that is satisfactory in those cases where it is desired to form a structure that must support a load. In fact when such a load rests in any way, it bears upon the plastic strand and has a tendency to force it to spring away from its contact with the plastic sheeting. Further, the strand itself being composed of a material no stronger than the plastic sheeting per se, namely the plastics above set forth, it has no great inherent strength.

I now provide a construction that in addition to eliminating the many structural deficiencies in the prior art above set forth, also materially improves the process of manufacture of constructions such as I desire to make, namely containers, displays covers and plastic constructions generally.

My invention comprises the employment of a metal wire coated with a thin layer of plastic material as the reinforcing member for the edge of the plastic sheeting. The plastic coated wire is employed as an integral unit which is joined to the plastic sheeting. It acts not only as the reinforcement for the inherently weak edge of the plastic sheet, but also as a guide member for the placement of plastic sheets which are subsequently joined to the beaded plastic sheet which is a starting element in my construction.

More specifically I take a plastic sheet cut to the desired shape and on to and flush with the edge thereof I lay the plastic coated wire. By means of the application of solvent, such as acetone, the plastic coated wire is caused to adhere very easily in its proper position. Because of the fact that I employ a wire core that is of soft metal and because I use only a thin coating of plastic on that wire it can be set without tendency to spring back. After the plastic coated wire has thus been "tacked" by means of solvent on to the plastic sheet, I apply a relatively high boiling point plasticizer, such as dibutylphthalate or the like to this contact point to cause a coalescing of the plastic coating on the wire and the plastic sheeting. This plasticizer may be applied either to one or both sides of the contact points of the plastic coated wire with the plastic sheet.

Now having a properly shaped plastic sheet with the plastic coated wire formed about its edge and flush therewith, I position in contact with the plastic sheet and within the plastic coated wire a second plastic sheet adapted to form another wall of the structure. The plastic coated wire acts as a true guide supporting member for this second plastic sheet so that the operator need devote little time to truing the contact of the second plastic sheet with the first plastic sheet since the plastic coated wire which is set on to the first plastic sheet determines the positioning of the second plastic sheet.

Then, by the application of volatile solvent and/or high boiling point plasticizer at the contact point of the second plastic sheet with the plastic coated wire a firm joint is obtained. Similarly, other walls if necessary may be added to the structure.

The metal which forms the core of my reinforcing, guiding member may comprise brass, soft steel, copper, iron or any suitable material. As I have set forth the metal should be relatively soft so that it can be set without having a strong tendency to spring back from the set. Because of the plastic coating I may use metals that are normally oxidizable such as iron since the plastic coating protects such metal against oxidation. When I employ copper, brass or silver colored metals and then coat these with transparent plastic material, an extremely attractive reinforcement edging is obtained.

The construction formed with this plastic-coated soft wire around and flush with the edge of the plastic sheet not only presents an improved appearance since the unsightly cut edges are no longer noticeable but also the construction is greatly improved with respect to resistance to sudden stresses or blows on such edges. Although the metallic wire is soft in the sense that it can be set very easily without a tendency to spring back, it still has a far greater strength than a thin plastic strand of an approximate dimension.

A further advantage of this plastic coated wire over the plastic strand employed in my previous patent referred to lies in the fact that the plastic strand has a tendency to become fragile and deteriorate with exposure to heat or sunlight for a long time because of the drying out of the solvent contained within it. Upon such evaporation of the contained solvent or plasticizer it is under various strains and has a tendency to split or separate from the plastic sheet to which it is joined as reinforcement.

Further, the plastic strand, even when softened by heat so that the proper curvature can be imparted to it to set adjacent the edge of the plastic sheet, has a permanent tendency to return to its normal shape and thus there is always a strain on the bond between the plastic strand and the plastic sheet. These factors are of great importance, of course, in the construction since a separation of the plastic strand from the sheeting is an extremely serious matter since the ordinary user has no means for reattaching the strand to the plastic sheet, and in fact, this could be done only with difficulty if a proper bond is to be obtained, even by an experienced operator.

Obviously, in a new development like these transparent containers it is of great importance that the consumer be given no cause for a complaint of this nature since a failure on the part of the reinforcement such as I have set forth practically destroys the value of the container.

I wish to lay particular emphasis on the novel process which I employ in the fabrication of these plastic sheet constructions by using the plastic coated wire as a guide member for the positioning and securing of the different plastic sheets in proper place. Because this guide member securely and efficiently positions the subsequently placed plastic sheets the operator can work much faster and hence the cost of the articles are materially reduced since in items of this nature the labor cost of fabrication is an important item.

Of further importance is the fact that whereas it has previously been difficult to obtain good joints between the plastic sheets because an edge-to-edge contact of the plastic sheets of themselves is obviously very poor in strength or permanence, I now provide a joint in which the two plastic sheets are positioned to right angles to each other and are secured to each other by means of their adhesion to the plastic-coated wire reinforcement member. That is, the adhesion is effected between the side surface of the plastic sheet and the plastic periphery of the plastic coated wire. Thus, a firm and strong joint is obtained.

It is the object of my invention, therefore, to provide a novel reinforced plastic structure comprising a plastic sheet member with a plastic coated soft metal wire secured thereto.

It is still another object of my invention to provide a novel guide member and plastic construction comprising a plastic coated wire.

A further object of my invention is to provide a novel edge reinforcement member comprising a soft metal core and a plastic coating thereover.

It is still a further object of my invention to provide a novel process of manufacture of plastic sheet structures which comprise the permanent placement of a plastic coated wire on a plastic sheet which placement determines the shape of the plastic sheet subsequently placed in edge contact therewith.

It is a further object of my invention to provide a novel joint between plastic sheets which comprises interposed plastic coated wire which is secured to the side surface of each of said plastic sheets.

It is a further object of my invention to provide a novel edge reinforcement member comprising a soft metal core and a relatively thin plastic coating thereover.

It is a further object of my invention to provide certain improved steps in the process of manufacturing of plastic sheet constructions as will be particularly described in the following specific description of my invention.

Further objects of my invention will be apparent in the following description taken in connection with the drawing in which.

Figure 1:
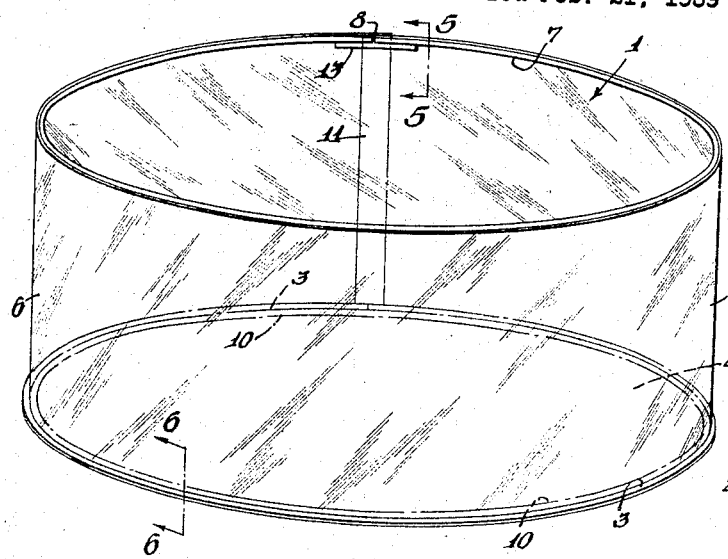
Figure 1 is a perspective of a transparent walled container showing the plastic-coated wire reinforcements of my invention.
Figure 5:
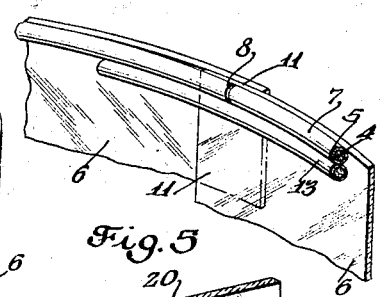
Figure 5 is a detail taken along the line 5—5 of Figure 1 in partial cross-section and perspective.

Referring now more specifically to Figure 1, the container generally denoted as 1, comprises a base 2 which may, for example, comprise a sheet of transparent cellulose acetate. On the base 2 is a plastic-coated wire 3. Rising from this base is a side wall 6 of transparent material, said side wall carrying at its upper inside edge a plastic-coated wire 7 which serves to strengthen and reinforce this upper edge. The plastic-coated wire terminates as shown at the point 8 and is reinforced at that point, which also is the overlap of the side wall material, by a short length 13 of a plastic coated wire.

Figure 6:
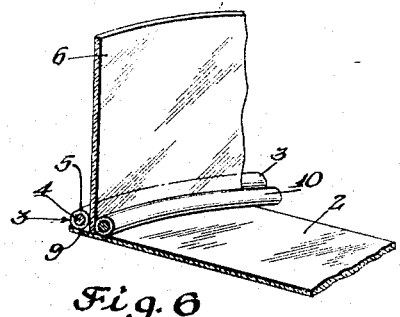
Figure 6 is a detail taken along the line 6—6 of Figure 1 showing the structure in partial cross-section and perspective.

Referring now more in detail to this construction and referring therefore to Figure 6, I show the plastic-coated wire 3 which comprises the core 4 of soft metal such as copper or soft steel coated with a thin coating of a plastic material 5 which may be any of the plastic compounds previously set forth herein before. Because of the soft core of this plastic wire, it may be with facility bent to proper shape. It is then secured to the base 2 first by the application of a volatile solvent such as acetone, alcohol—ether, etc., and then after it has properly tacked in place by the volatile solvent, it is permanently secured by the application of a high boiling point plasticizer such as dibutyl phthalate which acts to coalesce the plastic coating of the wire with the plastic sheet material 2.

One method of my invention then comprises the positioning of the side wall 6 of transparent plastic material on the base 2 by guiding it in place within the plastic coated wire 3. It is secured to the plastic coated wire by the application of a volatile solvent and/or a high boiling point plasticizer at the point 9. The overlap 11 is secured similarly by the use of a solvent and/or a plasticizer. Then within this side wall 6 a further plastic-coated wire reinforcement 10 is laid in place and secured both to the side wall 6 and to the base 2 by the use of a volatile solvent and/or the high boiling point plasticizer.

Thereupon about the upper inside edge of the side wall 6, the operator places a plastic coated wire reinforcing member 7 set flush with the upper edge of the side wall thereby in effect widening the upper edge and strengthening it both against tensile stresses and impact forces. The two ends of the plastic coated wire 7 terminate at the point 8 and are reinforced from below by the short section of plastic coated wire 13. This short length of reinforcement not only reinforces this portion of the edge against tensile and impact forces but also strengthens the overlap joint of the side wall because it adheres to both portions of the overlap and also to the respective ends of the plastic coated wire 7.

Figure 3:
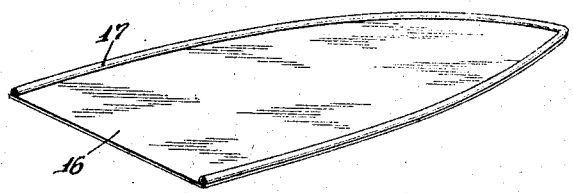
Figure 3 is a perspective of a side wall of the display cover shown in Figure 2 with the plastic-coated wire reinforcement in place ready to act as a guide member for the positioning of the front and rear walls.
Figure 2:
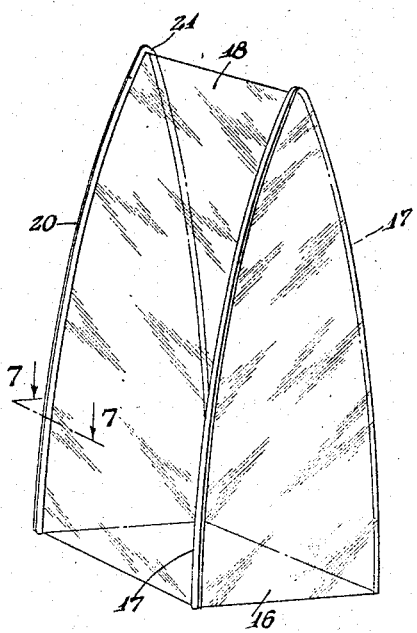
Figure 2 is a perspective of a transparent walled display cover showing the plastic coated wire reinforcement and construction of my invention.
Figure 4:
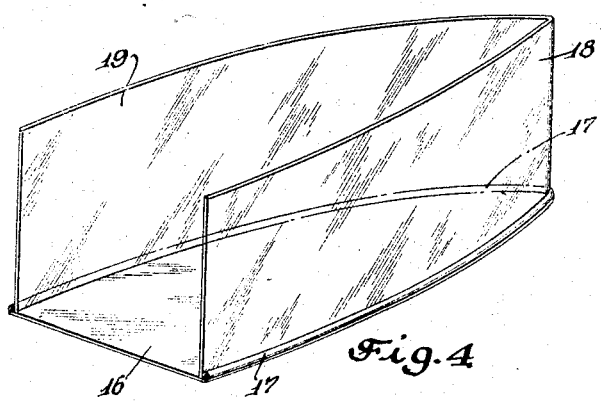
Figure 4 is a perspective representing the next step in the construction of the display cover of Figure 2 showing the front and rear walls applied and positioned between plastic coated wire as shown in Figure 3.

In Figure 2 I show the side wall 16 which may be of transparent sheeting which side wall carries about its periphery the plastic-coated wire 17 which is secured to it by means of volatile solvent and/or a high boiling point plasticizer. When the plastic coated wire has been secured to the side wall 16, the transparent sheeting 18 which comprises the front and rear wall of the display cover is positioned within it and secured to both the plastic sheeting 16 and the plastic coating of the wire 17 by means of a solvent and/or a plasticizer as is more particularly set forth in Figures 3 and 4. Thereupon over the open end 19 of the sheeting 18 there is fitted the other side wall 20 which carries the plastic coated wire 21 secured about its periphery as explained above in connection with side wall 16. By means of solvent and/or plasticizer the sheeting 18 is then secured both to the side wall 20 and to plastic-coated wire 21.

Figure 7:
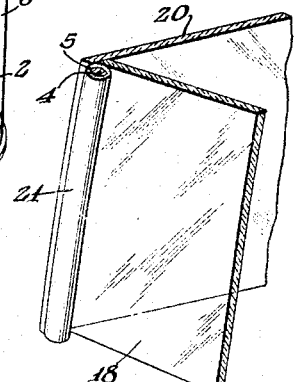
Figure 7 is a detail taken along the line 7—7 of Figure 2 and showing the construction in partial cross-section and perspective.

Thus it can be seen that the features of my construction reside not only in the reinforcement which is afforded to the construction by the employment of the plastic coated wire but also in that the plastic-coated wire acts as a guide so as to make possible the more rapid assembly and manufacture of these constructions. My plastic-coated wire member further acts as shown particularly in Figure 7 as an additional bond member between plastic sheets which are to be joined. The additional bonding strength is obtained because of the additional bonding area which is formed by solvent and/or plasticizer between the periphery of the plastic coating on the wire and the sheets which are coalesced thereto. Further the three points of contact, namely two adhesions by the sheets to be joined onto the periphery of the wire and the further adhesive contact between the sheets themselves makes a multiple bond that has a new and improved strength.

The novel plastic coated soft metal core reinforcing member of my present invention presents the new and unexpected results of firm and permanent set to shape of this plastic coated wire after proper shaping in accordance with the reinforcement to be made; elimination of strains, shrinkages and resultant warping such as were experienced with the plastic strang reinforcement used before; permanent engagement without distortion or separation under the influence of heat; improved impact and tensile strength;

novel color effects as for example gold by the use of brass or copper wire, and silver by the use of a steel or iron core. The plastic may be transparent or colored.

The plastic coating on the wire is preferably relatively thin. This thin coating is advantageous because the plastic coating can then be very rapidly softened by the application of heat or solvent so that it may be quickly bent to shape. Further, because of its relative thinness, its set is controlled by the relatively stronger metal core of the wire.

Shaping of the plastic sheeting is effected by the use of heated forms of wood or metal. The plastic sheeting, for example cellulose acetate is heat responsive and can be readily shaped about or in such heated forms.

The shaping forms may be suitably heated by steam, hot water or electrical heating means. The plastic sheet may be prewarmed before shaped around the heated forms or the heat of the forms alone may be relied upon to soften the plastic sheets.

As an improved step in the manufacturing processes here set forth I prefer to preform the plastic coated wire by heating it and shaping it to the general curvilinear path which it is to ultimately assume in the article to be formed. After it is heated and shaped to the desired form, it retains that curvilinear shape and as in the case of plastic-coated wire 10 shown in Figures 1 and 6, it is easily solvent-tacked in place.

It is to be noted that the solvent and plasticizer that have been set forth hereinbefore have been given only as an example and that the particular plasticizer that is to be used is to be determined by the plastic. The selection of suitable volatile solvents and high boiling point plasticizers will be apparent to those skilled in the art.

It is not desired to embody a volatile solvent that rapidly attacks plastic even for the temporary tacking since it is only necessary to soften the plastic to cause adjacent plastic parts to coalesce.

The construction that I have shown in Figure 1 herein, the joint of the side wall 6 with the base 2, is effected and reinforced by the outer plastic-coated wire 3 and the inner plastic coated wire 10 which gives a joint construction of surprising strength. It can be appreciated that the base joint here is subjected to a good many stresses and strains both in shaping, handling, packing and use. The plastic bond induced between the plastic walls 6 and 2 and the wires 3 and 10 at the plurality of points as particularly shown in Figure 6 not only produces a bond of good strength between the parts but further provides reinforcement against tendency to rupture in any direction. The wire core of the plastic coated wire provides a relatively high strength reinforcement particularly because the compression of an interior and exterior wire is used.

The plastic coating of the wire may, like the plastic sheets, be of any of the plastic materials as set forth in the beginning of the specification. These plastic materials may be used in the transparent or colored form.

Although I have set forth that the plastic coated wires are adhered to the plastic sheets by means of a solvent and/or plasticizer, I do not preclude the use of an adhesive of any suitable nature.

Further, although I have described my invention with reference particularly to containers and display covers, it is to be understood that there are wide varieties of plastic structures to which the invention presently set forth is applicable, and that I use the terms "containers" and "display covers" by way of illustration only. Specifically included within such containers are hat boxes, cake boxes, shoe boxes, linen boxes, handkerchief boxes, glove boxes and blanket boxes.

The plastic construction of my invention may be formed either from plastic sheeting or from plastic materials generally whether in sheet form or not in combination with the plastic coated wires. By plastic materials, I mean the chemical compounds generally to which this term is applied whether they be true thermoplastics or not. I have found cellulose acetate sheeting is a commercially practical example of the plastic sheeting that may be employed.

The reinforcement element of my invention comprises in its desired form a metallic wire having a plastic coating. The metal of the wire is preferably relatively soft so that it can be readily bent to shape during the operation and still has relatively high strength for the edge reinforcement which it is adapted to effect. The wire core has proper strength for resisting tensile impact stresses.

The coating of plastic material over this metallic core is relatively thin with respect to the all over diameter of the reinforcing wire since I am employing the plastic coating of the wire primarily for its properties of adhesion and appearance, which properties do not necessitate much thickness of material. It is obvious that a great saving in the relatively high priced plastic material is also effected by means of my novel construction.

Although I have set forth that I prefer the reinforcement wire of my invention to have a soft metallic core, it is within the purview of my invention to employ a harder metallic wire as the center of the reinforcing wire when such property is desirable for the particular work to be carried out.

The relative flexibility and hardness of the wire core of my reinforcement member is, as indicated, determined by the reinforcement which it is desired to effect. Although I have particularly described the core of my reinforcement as being metal, it is further within the purview of my invention to employ materials other than metal as the central reinforcing core and to that end I desire to point out that I may employ plastics and other materials as the core material with the general proviso that the core be of greater strength than the exterior coating and that the coating be readily bondable to the structure which it is desired to reinforce.

It is further important to note that the reinforcing plastic-coated wire of my invention is an independent reinforcing element which may be with facility employed as a guide member and which may be applied laterally with respect to the weakened edges to provide necessary reinforcement. My invention is not to be confused with the simple incorporation of a wire at the terminus of a construction to provide for shaping or reinforcement. The plastic-coated wire reinforcement member of my invention is an independent element that is employed in the manufacturing process in an entirely different way and whose ultimate functions are far superior.

From the above description it will be apparent to those skilled in the art that the principles of this invention are adapted to wide variation without departure from the scope thereof. I do not, therefore, desire to be strictly limited to the disclosure as given for purposes of illustration, but rather to the scope of the appended claims.

I claim:

1. A container formed of plastic material, said container comprising a side wall and an end wall, said end wall projecting outwardly beyond the outer surface of said side wall to form a peripheral channel therewith, a plastic strand having a substantially circular cross section positioned in said peripheral channel and being adhesively secured to said side wall and to said end wall adjacent the junction of the side wall and said end wall, the surface portions of said strand facing and secured to said side wall and said end wall providing a medium joining said side wall to said end wall along an adhesion area materially larger than the junction between said side and said end wall, said strand being of sufficiently large bulk as to constitute a strengthening reinforcement of said junction between said side wall and said end wall, said plastic strand comprising a soft metal core coated with a plastic.

2. A container having a thin self-sustaining wall of plastic material, said wall having a free cut edge defining an opening in said container, said edge having relatively low resistance against strains, a strand substantially circular in cross section having a plastic peripheral surface and a soft metal core, said strand being adhesively secured to said plastic wall in tangential contact relation thereto adjacent said free cut edge, said strand being secured to said wall in such a position that one side of said strand is substantially even with and parallel to said free cut edge, said strand being of sufficiently large diameter to constitute a strengthening reinforcement for said free cut edge against strains.

3. A container formed of plastic material comprising a first thin flexible self-supporting plastic curved wall forming an enclosure, said wall having a thickness of at least 5 thousandths of an inch, and a second thin flexible self-supporting plastic flat wall having a thickness of at least 5 thousandths of an inch, one end of the curved plastic wall being secured to the flat plastic wall and forming a container having therein an inner continuous peripheral channel at the juncture of said walls, said first plastic wall being secured to said second plastic wall, a strand having a curved peripheral surface positioned in said channel formed by the junction of said first plastic wall and said second plastic wall, said strand having a plastic surface and a soft metal core, one portion of the curved peripheral surface of said plastic strand being fused to said first plastic wall and a second portion of the curved peripheral surface of said plastic strand being fused to said second plastic wall, said curved peripheral portions of said strand providing an adhesion area with said first plastic wall and said second plastic wall substantially greater than the junction area between said first plastic wall and said second plastic wall, said strand being of sufficiently large bulk as to constitute a strengthening reinforcement of said joint between said first plastic wall and said second plastic wall.

MAXIMILIAN COURTLAND MEYER.